UNITED STATES PATENT OFFICE.

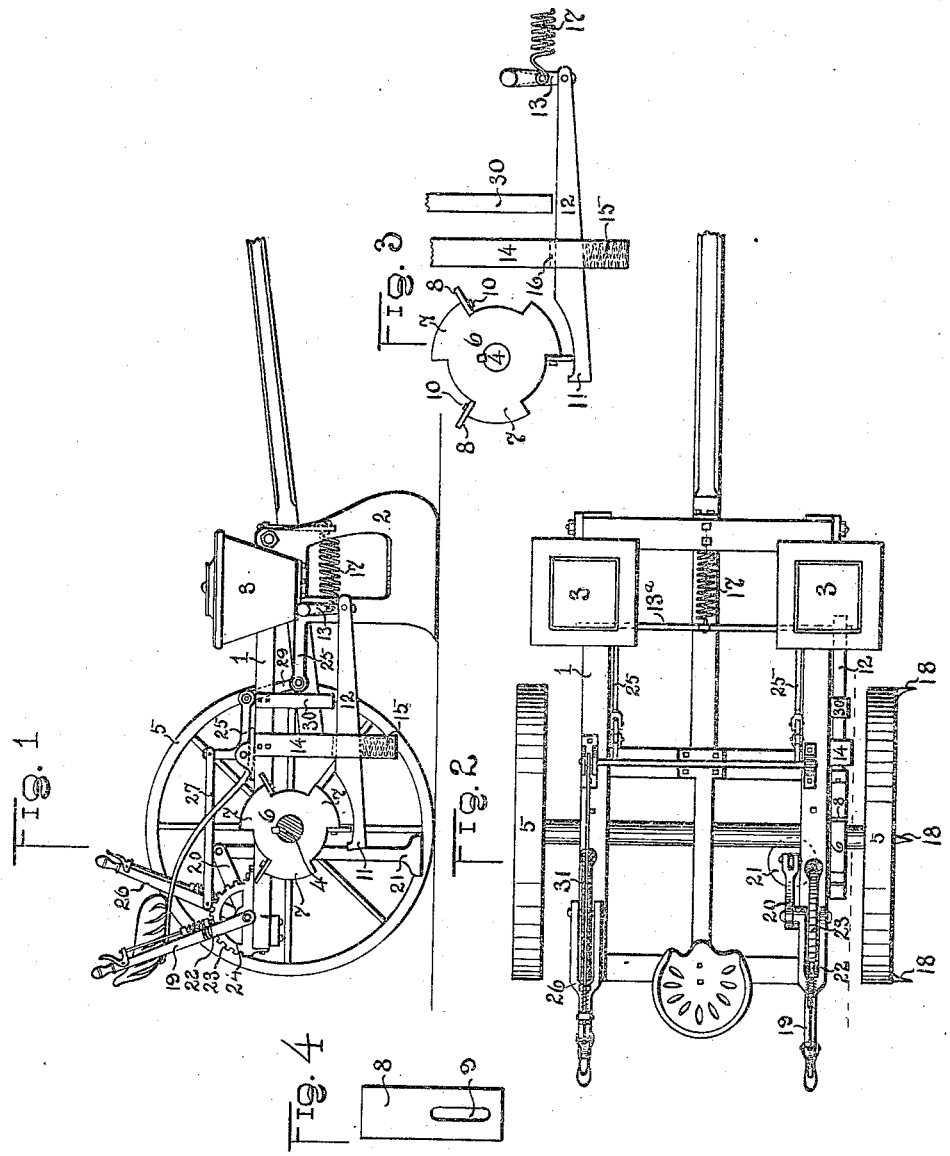

ANDREW R. GILMORE, OF MASON, ILLINOIS.

PLANTER.

961,769.  Specification of Letters Patent.  Patented June 21, 1910.

Application filed January 7, 1910. Serial No. 536,873.

*To all whom it may concern:*

Be it known that I, ANDREW R. GILMORE, citizen of the United States, residing at Mason, in the county of Mason and State of Illinois, have invented certain new and useful Improvements in Planters; and I do hereby declare the following to be a full, clear, and exact description of the invention, such as will enable others skilled in the art to which it appertains to make and use the same.

My invention relates to new and useful improvements in planters and more particularly to the class adapted to be used for dropping corn and my object is to provide means for automatically operating the dropping mechanism from the supporting wheels of the planter.

A further object is to provide means for elevating the supporting wheels of the planter, whereby the parts may be set to properly plant the corn in rows.

A further object is to provide suitable markers for the planter and a still further object is to provide means for stopping the operation of the dropping mechanism.

Other objects and advantages will be hereinafter referred to and more particularly pointed out in the claims.

In the accompanying drawings forming part of this application, Figure 1 is a side elevation of a planter with one of the wheels thereof removed and the axle in section. Fig. 2 is a top plan view of the planter. Fig. 3 is a detail elevation of the operating parts of my invention. Fig. 4 is a plan view of a detail of the operating mechanism.

Referring to the drawings in which similar reference numerals designate corresponding parts throughout the several views, 1 indicates a frame such as is usually employed for planters of this class, to the forward portion of which are attached runners or furrow openers 2 and also carried by said frame are hoppers 3 of the usual or any preferred form, adapted to contain grain, the usual form of discharging mechanism for said hoppers being provided. As they form no part of my invention, it is not deemed necessary to further show or describe the same.

Adjacent the rear of the frame 1 is an axle 4, upon which are mounted bearing wheels 5, said wheels being fixed to the axle, whereby the axle will be driven when the planter is moved forwardly and in order to operate the dropping mechanism in the hoppers 3, I provide a disk 6, said disk being keyed to the axle 4, adjacent one of said wheels and provided at intervals around its periphery with lugs 7, the end faces of said lugs having attached thereto fingers 8, in the inner end portions of which are provided slots 9, through which extend screws 10, the inner ends of the screws entering the end walls of the lugs, thereby adjustably securing the fingers to the lugs.

The free ends of the fingers extend beyond the periphery of the lugs and into a curved pathway adjacent the end of a bar 12, then into engagement with a latch 11, carried by the end of said bar so that as the disk is rotated, the bar will be intermittently moved lengthwise by the engagement of the fingers with the latch 11, and by attaching the forward end of the bar 12 to a crank 13, said crank 13, being mounted on a transverse bar 13$^a$ extending from hopper to hopper to which is in turn secured the dropping mechanism within the hoppers, the rearward movement of said bar will operate the dropping mechanism and deposit a predetermined quantity of the grain in the hoppers into the furrow made by the runners 2. The end of the bar 12 containing the latch or projection 11 is normally held in the path of the fingers 8 by extending said bar through a hanger 14, which hanger is carried by the frame 1 and in order to permit the latch end on the bar to descend in order to remove the latch from the path of the fingers, a spring 15 is introduced between the lower edge of the bar 12 and the bottom section of the hanger 14, while the upward movement of said bar is limited by means of a cross pin 16, carried by the hanger.

The periphery of the lugs 7 will engage the upper face of the bar 12 when the disk has been rotated a certain distance, thus directing downward pressure on the bar and releasing the latch from the finger, when the bar and parts attached thereto will be returned to their initial positions through the medium of a spring 17, one end of which is attached to said bar 13$^a$ and the opposite end thereof to parts of the frame 1, thus causing the dropping mechanism of the planter to return to a position to again deposit grain into the runners when the bar 12 is operated.

One of the wheels 5 is provided with suitable markers 18, which are placed in registration with the fingers 8, whereby the point of depositing the grain in rows will be indicated and if upon turning at the end of the field it is found that the parts will not cause the grain to drop in alinement with the marks made by said markers, the axle 4 and wheels thereon are to be elevated so that the wheels may be readily rotated and bring the parts in position to drop the grain in registration with the grain dropped in the other rows. This result is accomplished by pivotally mounting upon the frame, a lever 19, to the arm 20 of which is attached a prop 21, so that when said lever is swung forwardly, the prop will be lowered into engagement with the soil and the driving wheels elevated out of engagement with the soil, when said wheels may be rotated and the dropping parts properly set, the lever 19 having a spring latch 22 thereon which is adapted to engage with teeth 23 on a rack 24 and it will be readily seen that the prop 21 may be readily supported in its raised or lowered position.

The fingers 8 may be allowed to extend farther beyond the periphery of the disk 6 through the medium of slots 9 and adjusting screws 10, and when so adjusted the fingers engaging the latch 11 will hold the bar 12 in its extended position for a longer period of time.

When the planter is being moved from place to place, or when turning at the ends of the rows, the runners are raised from the ground which in turn raise one end of the bar 12, the pendent arm 30 simultaneously depressing said bar 12, and moving the latch 11 out of the path of the fingers 8, so that said disk can be freely rotated, without operating the dropping mechanism.

This device may be attached to any suitable form of planter and at a very nominal expense, thus dispensing with the use of wires or similar devices for dropping the grain and it will further be seen that the parts may be readily set for checking the rows in both directions. It will further be seen that the dropping mechanism may be entirely disengaged from the operating mechanism when so desired.

What I claim is:

1. In a corn planter, the combination with a frame having runners thereon, grain receiving hoppers attached to the frame, said hoppers having dropping means therein and a crank; of a shaft, wheels fixed to said shaft, a disk fixed to said shaft and having lugs around the periphery thereof, fingers attached to said lugs, a bar attached at one end to said crank, a latch on the opposite end of said bar adapted to be engaged by said fingers and draw said bar forward, a guiding means for the free end of said bar with means to normally retain the latch in the path of said fingers and additional means to return the bar to its initial position when released from said latch.

2. In a planter, the combination with a frame, runners attached to said frame, hoppers having dropping mechanism therein, a shaft and supporting wheels fixed to said shaft; of a disk fixed to said shaft, fingers adjustably attached to said disk, a bar connected at one end to the dropping mechanism in the hoppers, a latch carried by said bar adapted to be engaged by said fingers to move the bar lengthwise, means to return the bar to its initial position, a spring adapted to normally hold the latch in the path of said fingers, means to raise the wheels from the ground and additional means to move the latch out of the path of said fingers.

3. In a corn planter, the combination with a frame, hoppers carried by the frame, said hoppers having dropping mechanism therein, an axle and wheels supporting said axle; of a disk fixed to said axle, lugs at predetermined intervals on said disk, fingers adjustably secured to said lugs, a bar connected at one end to said dropping mechanisms, a latch on said bar adapted to be engaged by said fingers, a hanger through which said bar extends, a spring carried by said hanger, adapted to direct upward pressure on the bar and an additional spring at the forward end of the frame adapted to return the bar to its initial position when released by the fingers.

In testimony whereof I have signed my name to this specification in the presence of two subscribing witnesses.

ANDREW R. GILMORE.

Witnesses:
  OTHO I. KING,
  N. S. FORSYTH.